US005558476A

United States Patent [19]
Uchida et al.

[11] Patent Number: 5,558,476
[45] Date of Patent: Sep. 24, 1996

[54] DUAL-MOTOR-DRIVEN DRILLING MACHINE AND METHOD OF CONTROLLING CURRENTS FLOWING IN MOTORS

[75] Inventors: Toshiaki Uchida; Masateru Niyada; Shigeru Shinohara; Hiroaki Orikasa; Hiroyasu Ishikawa, all of Katsuta, Japan

[73] Assignee: Hitachi Koki Co., Ltd., Tokyo, Japan

[21] Appl. No.: 478,776

[22] Filed: Jun. 7, 1995

Related U.S. Application Data

[63] Continuation of Ser. No. 974,218, Nov. 10, 1992, abandoned.

[30] Foreign Application Priority Data

Jul. 16, 1992 [JP] Japan ..................... 4-188462

[51] Int. Cl.⁶ ............................ B23B 35/00; B23Q 15/20; B23Q 15/12
[52] U.S. Cl. ................... 408/1 R; 408/11; 408/9; 408/3
[58] Field of Search ............... 408/3, 5, 6, 1 R

[56] References Cited

U.S. PATENT DOCUMENTS

| | | | |
|---|---|---|---|
| 3,874,809 | 4/1975 | Hahn et al. | 408/9 |
| 4,076,442 | 2/1978 | Cox, Jr. et al. | 408/59 |
| 4,292,571 | 9/1981 | Cuneo | 408/9 |
| 4,338,556 | 4/1982 | Hetzel | 408/11 |
| 4,540,318 | 9/1985 | Hornbug et al. | 408/9 |
| 4,831,364 | 5/1989 | Shinohara et al. | 340/680 |
| 5,170,358 | 12/1992 | Delio | 340/680 |

FOREIGN PATENT DOCUMENTS 63-200903  8/1988  Japan.

Primary Examiner—M. Rachuba
Assistant Examiner—Kenneth J. Hansen
Attorney, Agent, or Firm—Sughrue, Mion, Zinn, Macpeak & Seas

[57] ABSTRACT

An automatic drilling machine has an electric drilling unit on which a cylindrical cutter is rotatably mounted. The drilling machine includes a drill motor for rotating the cutter and a feed motor for linearly moving the cutter for the purpose of drilling into materials such as concrete. The current flowing through the drill motor before a drilling load is imposed thereon is detected for a microprocessor to determine the type of the cutter being used. The drill motor is driven at a rotation speed suitable for the cutter being used and the feed motor is driven at a speed such that the rotation speed of the drill motor thus set is maintained unchanged. Particularly, the drill motor is driven at a reduced rotation speed from the start of drilling until a predetermined drilling depth is reached to reduce chatter vibration which may otherwise be generated if the drill motor is driven at a regular constant speed from the beginning of drilling until the end.

12 Claims, 4 Drawing Sheets

DUAL-MOTOR-DRIVEN DRILLING MACHINE AND METHOD OF CONTROLLING CURRENTS FLOWING IN MOTORS

This is a Continuation of application Ser. No. 07/974,218. filed Nov. 10, 1992 now abandoned.

BACKGROUND OF THE INVENTION

1. Field of the Invention

This invention relates generally to an electric drilling machine, and more particularly to a dual-motor-driven drilling machine equipped with an electric control system. The invention further relates to a method of controlling currents supplied to in built-in motors of the drilling machine.

2. Description of the Prior Art

Drilling machines of the type relevant to the present invention often include two motors. One is a drill motor for rotating a cylindrical cutter and the other is a feed motor for feeding the cylindrical cutter during drilling. In conventional drilling machines, the feed speed of the drilling unit is controlled so that the rotation speed of the cylindrical cutter is held at a fixed value when drilling. In other words, the current flowing through the feed motor is controlled so that the current flowing through the drill motor maintains a fixed value.

On the other hand, different types of cylindrical cutters are selectively used depending on such factors as the material to be drilled, the diameter of the hole desired and the depth of the hole desired. When using cylindrical cutters that are large diametered, long, or both, the fixed rotation speed is too high for such cutters to execute drilling, so the drill motor is liable to quickly overload. Contrarily, when using cylindrical cutters that are small diametered, short or both, the fixed rotational speed is too slow for such cutters so that drilling is less than optimally efficient.

Other problems with existing drilling machines include chatter vibration that is sometimes generated at the cylindrical cutter when drilling starts, dispersion of swarf and water from the object being drilled, difficulty in drilling at desired angles and difficulty in removing the drill bit from the object drilled once drilling is completed.

SUMMARY OF THE INVENTION

The present invention has been made to solve the aforesaid problems. Accordingly it is an object of this invention to perform drilling at a speed suitable for the cylindrical cutter being used.

Another object of this invention is to eliminate the chatter vibration of the cylindrical cutter that is generated when drilling starts.

To achieve the above and other objects, this invention restricts the initial rotation speed of the cylindrical cutter to a set value at the start of drilling thereby eliminating chatter vibration of the cylindrical cutter. This invention sets the restricted initial rotation speed of the cylindrical cutter and the duration of time the speed is restricted to values best suited to the type of cylindrical cutter being used.

By obtaining the distance that the electric drill unit is fed from the start Of drilling, and identifying the length of the cylindrical cutter, cutting off the water supply immediately before the cylindrical cutter penetrates through the material being drilled it becomes possible to prevent water leaks and subsequently prevent the object being drilled from being soiled or otherwise stained by the water.

Drilling with the drilling machine of the invention is efficient because chatter vibration at the start of drilling is reduced and because the duration of time at which the drill motor is driven at slow speeds at the start of drilling is set to the duration of time best suited for the type of cylindrical rotating cutter being used.

Also, because the cylindrical rotating cutter is driven at the rotation and feed speeds best suited for the type of cylindrical cutter being used, efficient drilling becomes possible and interruptions in drilling operations due to overloads can be prevented.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
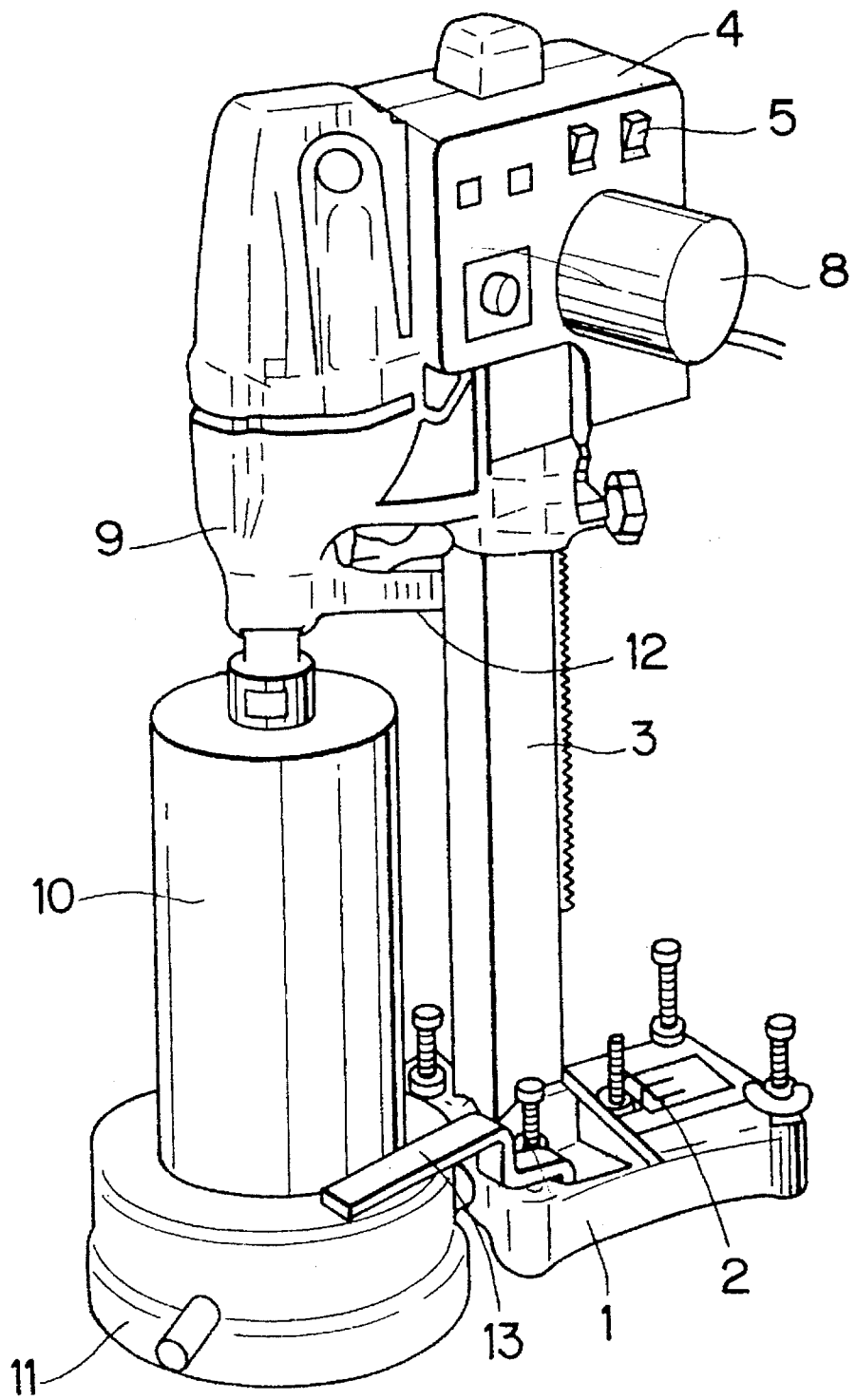
FIG. 1 is a perspective view of a drilling machine according to the present invention.

In FIG. 1, there is shown a drilling machine used for drilling concrete cores. The drilling machine includes an electric drilling unit 9 having a built-in drill motor 7 (not shown in FIG. 1) and a spindle. A cylindrical cutter 10 is detachably mounted on the spindle of the motor 7 to be rotatable therewith. An adapter 12 for supplying of water is mounted on the tip of the electric drilling unit 9. A water hose (not shown) is connected to the adapter 12 during drilling. The adapter 12 and water hose are provided for cooling the cylindrical cutter 10 and for clearing away swarf. A water treatment means 11 for discharging water and swarf is attached to the circumference of the cylindrical cutter 10 so as to allow the cutter 10 to be slidably movable relative to the water treatment means 11. A hose is connected to a water outport formed on the outer periphery of the water treatment means 11.

A control box 4 on which the electric drilling unit 9 and a reversible feed motor 8 are mounted is movably supported by a stand 3 so that the electric drilling unit 9 and the control box 4 can be raised and lowered. Switches such as a power switch 5 are attached to the front of the control box 4. The control box 4 accommodates a control circuit to be described hereinafter. A base 1 supports the stand 3. On the base 1 is at least one anchor bolt 2 for fixing the drilling machine to concrete or to an object to be drilled. Concrete or an object to be drilled are not shown in FIG. 1. A holder 13 extending from the base 1 to the upper surface of the water treatment means 11 is provided for preventing the water treatment means 11 from moving during drilling.

Figure 2:
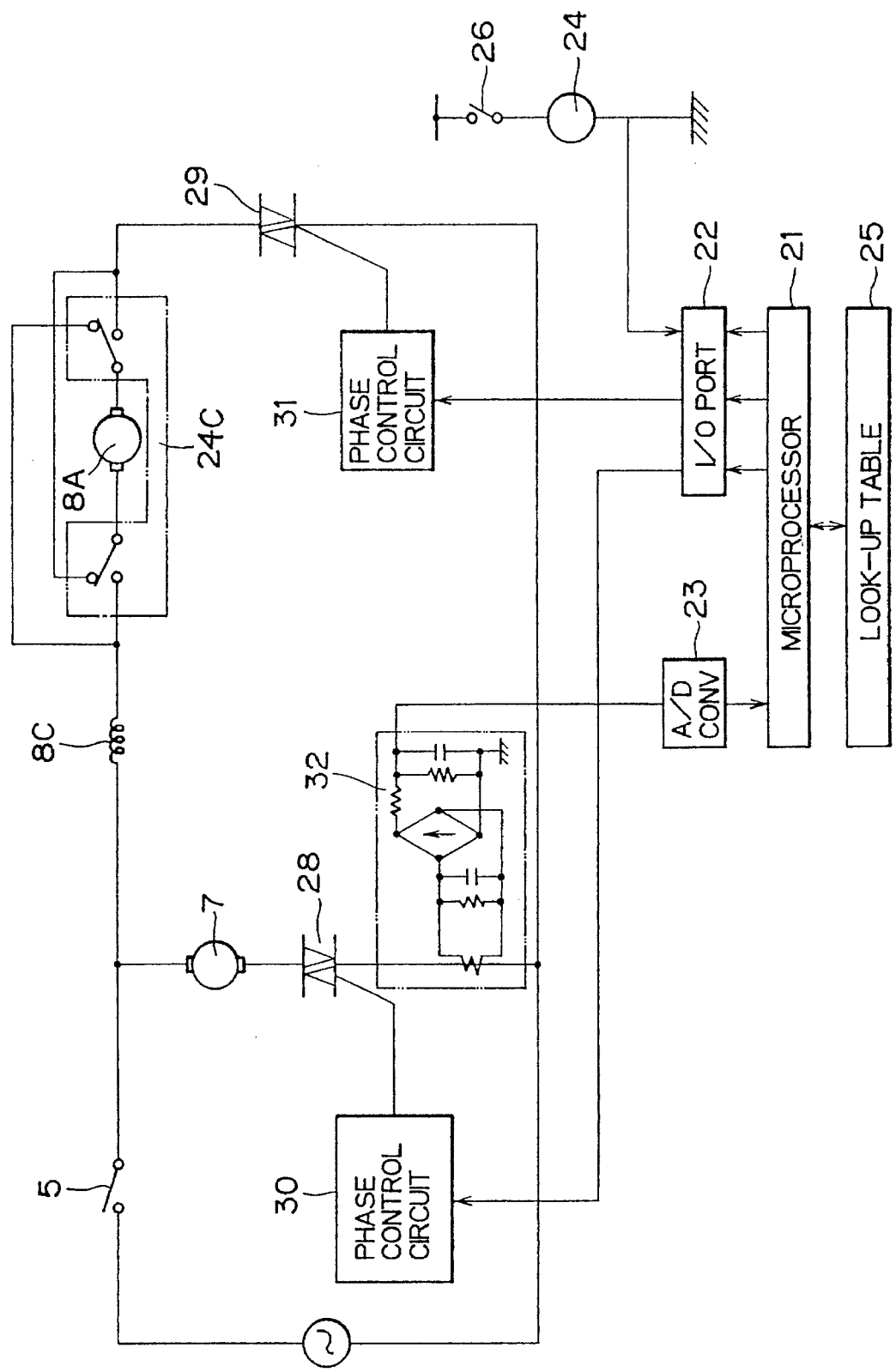
FIG. 2 is a circuit diagram of a control system of the drilling machine according to the present invention.

FIG. 2 is a circuit diagram of a control circuit for controlling the rotation speeds of both the drill motor 7 and the feed motor 8 and also for controlling the rotation direction of the feed motor 8. The speeds of the drill motor 7 and the feed motor 8 are controlled by Triacs 28 and 29, respectively. The firing angles of Triacs 28 and 29 are controlled by phase control circuits 30 and 31, respectively. The phase control circuits 30 and 31 are driven by a microprocessor 21 through an I/O port 22. The current flowing through the drill motor 7 is detected by a current detecting circuit 32 configured by such devices as a current transformer and a current-to-voltage converter. The detected current is subjected to analog-to-digital conversion by means of an A/D converter 23 and the resultant digital signal is sent to the microprocessor 21. Widen a drilling operation is completed, a relay coil 24 is energized by the microprocessor 21 through the I/O port 22. The relay coil 24 switches two relay contacts 24C in ganged fashion, thereby reversing the direction of current flow in the feed motor 8. A limit switch 26 is serially connected to the relay coil 24 and is provided in the control box 4. When the electric drill unit 9 returns to the position it was at the start of drilling, the limit switch 26 will open and the relay coil 24 is in turn deenergized. The current detecting circuit 32 inputs the value of the current flowing through the drill motor 7 to the microprocessor 21 which then compares the input current with a preset reference value and determines if they are equal or not. By means of the phase control circuit 31, the microprocessor 21 controls the firing angle of the Triac 29 to thus control the feed speed of the feed motor 8 so that the current becomes equal to the preset reference value. Reference characters 8A denotes an armature winding of the feed motor 8, and 8C a stationary winding of the feed motor 8.

Figure 3:
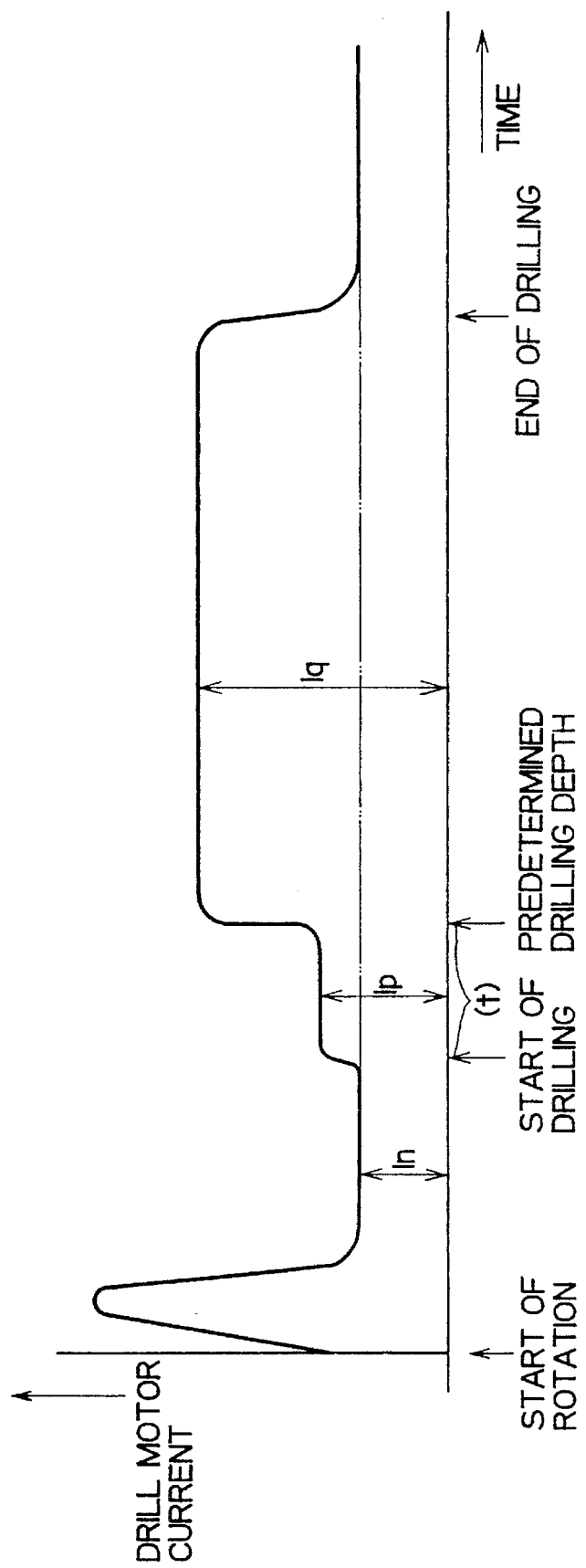
FIG. 3 is a graphical representation of the current flowing through a drill motor.

FIG. 3 is a graphical representation showing the waveform of current flowing through the drill motor 7. Immediately after the drill motor 7 starts rotating, an impulse current flows. After the impulse current flows and until drilling load is imposed on the motor 7, a current In (hereinafter referred to as "no-load current") flows that varies with the type of mounted cylindrical cutter 10. After drilling starts, a first current level Ip is set that varies with the type of cylindrical cutter 10. After drilling to a predetermined drilling depth which is determined as described hereinafter, a second current level Iq is set for further drilling. The value of In is less than Ip which is less than Iq, i.e., In<Ip<Iq. At the start of drilling, the duration of time the drill motor 7 is to be driven with the first current level Ip is determined depending on the type of cylindrical cutter 10 being used. Specifically, the microprocessor 21 determines the first and second current levels Ip and Iq based on the no-load current detected by the current detecting circuit 32. The microprocessor 21 further determines the duration of time t at which the drill motor is driven with the first current level Ip, that is, the predetermined drilling depth, based on the no-load current.

The cylindrical cutter 10 encompasses a variety of exchangeable drill bits. Some examples are, diamond core bits for drilling in such materials as concrete, stone and tile, hole saws used for drilling holes in such materials as ALC (autoclaved lightweight concrete) panel, and other hole saws used for drilling holes in such materials as mortar and plaster. The drill bits are of different diameter, length and thickness to produce the desired size of the hole being drilled. For example, diamond core bits come in diameters as small as 38 mm to as large as 450 mm.

When drilling first starts, if the cylindrical cutter has a small diameter, only a slight amount of chatter vibration will be produced and only for a short period of time. Contrarily, if the cylindrical cutter 10 has a large diameter, more chatter vibration will be produced and for a longer time. Also if the cylindrical cutter 10 has a small diameter, much more rapid rotation and feed speeds are possible than if the cylindrical cutter 10 has a large diameter. Rotation and feed speeds must be decreased because overloads can happen immediately upon start of drilling if the cylindrical cutter 10 has a large diameter.

According to the present invention, the type of cylindrical cutter 10 being used is identified based on the no-load current flowing in the drill motor 7, and the rotation and feed speeds of the motors are determined so as to be optimal for drilling with the cylindrical cutter 10 presently being used. The weight of the cylindrical cutter 10 changes depending on the type, so the load imposed on the drill motor 7 changes with the type of cylindrical cutter and the no-load current changes accordingly. A look-up table 25 is connected to the microprocessor 21, in which stored are information about the first current level Ip, the second current level Iq, the time t and the feed speed in relation to the no-load current. Therefore, the microprocessor 21 can determine the optimal speeds of the drill motor 7 and the feed motor 8 by referring to the look-up table 25 if the no-load current is given.

Figure 4:
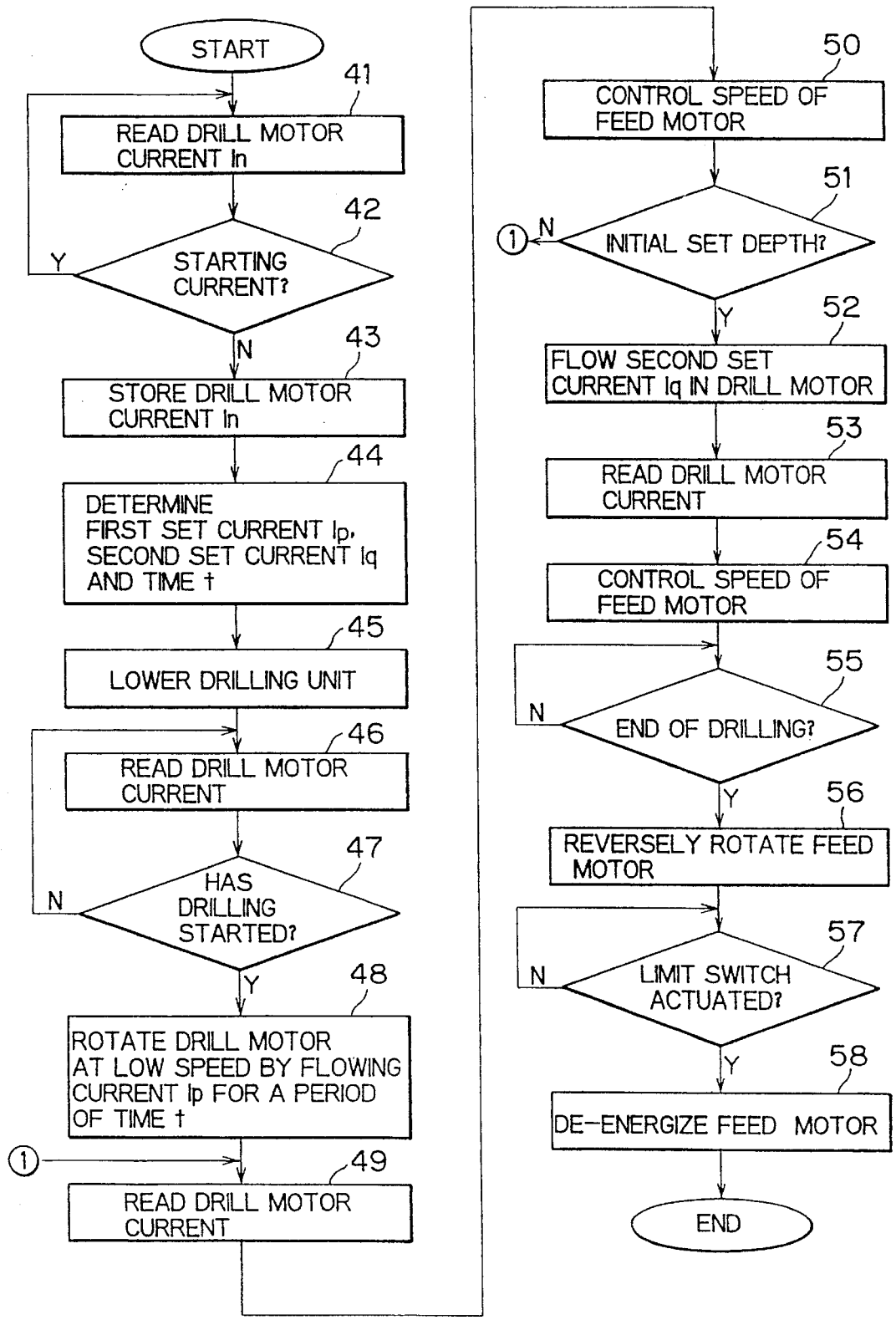
FIG. 4 is a flowchart illustrating a control sequence of a microprocessor of the present invention.

FIG. 4 shows a program illustrated in flowchart form to be executed by the microprocessor 21. Upon fixing the base 1 to the material to be drilled (for example, concrete) by means of anchor bolts 2 and mounting the cylindrical cutter to the electric drill unit 9, the program is started wherein the power switch 5 is turned on to start rotating the drill motor 7.

In step 41, a drill motor current flowing through the drill motor 7 is read at every predetermined sampling period. In step 42, it is determined whether the current read in step 41 is the starting current or not. The current flowing through the drill motor 7 is determined to be the starting current if there are substantial changes in the current levels consecutively read whereas the current flowing therethrough is determined not to be the starting current if there are not substantial changes in the current levels consecutively read. If the current flowing therethrough is the starting current, the program returns to step 41. If it is not the starting current, the program proceeds to step 43. Step 42 can be dispensed with if reading of the drill motor current is not performed until a predetermined period of time has expired from starting the drill motor 7.

In step 43, after the drill motor current read in step 41 is determined not to be the starting current, the current so determined is stored as the no-load current and the type of cylindrical rotating cutter 10 is specified based on the no-load current thus stored. In step 44, the first set current Ip, second set current Iq and time t for the cylindrical cutter being used are determined based on the no-load current.

In step 45, the feed motor 8 is energized through the phase control circuit 31 and the Triac 29 and the electric drilling unit 9 starts lowering in accordance with the rotation of the feed motor 8. In steps 46 and 47, the drill motor current is again read at every predetermined sampling period to determine whether or not drilling has started. If the drilling is determined not to have started based on the fact that there is no substantial change in the level of the drill motor current, the routine returns to step 46. If drilling is determined to have started based on the fact that there is a substantial increase in the level of the drill motor current, the routine proceeds to step 48. In step 48, the drill motor 7 is rotated at a low speed by feeding flowing the first set current Ip therethrough for the period of time t to eliminate chatter vibration of the cylindrical cutter 10 which may otherwise occur at the start of drilling if the drill motor 7 is rotated at a regular speed higher than the speed set by the present invention.

In step 49, the current flowing through the drill, motor 7 is again read and in step 50, the speed of the feed motor 8 is controlled so that the current flowing through the drill motor 7 is in coincidence with the first set current Ip. In step 51, it is checked whether or not the time t has expired from the start of drilling noted in step 47, to determine, in terms of the driving time period whether or not the initial set drilling depth has been reached. If the time t has been expired, it is determined that the initial set drilling depth has reached. If this is the case, the routine proceeds to step 52. If the initial set drilling depth has not been reached, the routine returns to step 49.

If it is determined that the initial set drilling depth has been reached, then the current fed to the drill motor 7 is changed to the second set current Iq by means of the phase control circuit 30. In step 53, the current flowing through the drill motor 7 is read. In step 54, the speed of the feed motor 8 is controlled in the same manner as in step 50 so that the current flowing through the drill motor 7 is in coincidence with the second set current Iq. Speed control of the feed motor 8 in steps 50 and 54 is actually carried out in an interrupt routine executed when a zero-cross-point of an a.c. current is detected. To simplify the description, the processing executed in the interrupt routine is illustrated in steps 50 and 54.

In step 55, the level of the drill motor current that was read in step 53 is compared with that of the drill motor current In stored in step 43 to determine whether or not the drilling is completed. If the comparison indicates that the levels of these two currents are equal to each other, then drilling is determined to have been completed, whereupon the routine proceeds to step 56. In step 56, the rotation direction of the drill motor 8 is reversed so that the electric drilling unit 9 is retracted. In step 57, it is determined whether or not the electric drill unit has retracted to the initial position by determining whether or not the limit switch 26 is actuated. If the electric drilling unit 9 is determined to have retracted to the initial position, the routine proceeds to step 58 in which the feed motor 8 is de-energized and one drilling cycle is thereby completed.

According to the embodiment described above, drilling can be more effectively performed because drilling is performed at the rotation and feed speeds that are optimal for the mounted cylindrical cutter 10. Further, chatter vibration can be completely eliminated because the drill motor is driven at a low rotation speed at the start of the drilling to eliminate chatter vibration and a period of time during which the drill motor is driven at the low rotation speed is individually determined depending on the type of cylindrical cutter 10 being used.

In view of the fact that the level of the no-load current tends to be lowered after a long-term use of the motor, a look-up table used for identifying the type of cylindrical cutter in response to the level of the no-load current needs to be modified each time upon the passing of a specified time of use so that the type of cylindrical cutter can be accurately determined in response to the lowered level of the no-load current.

While the present invention has been described with reference by a specific embodiment, it can be appreciated to those skilled in the art that many changes and modifications may be made without departing from the scope and spirit of the invention. For example, in view of the fact that the waveform of the start-up current of the drill motor 7 changes depending on the cylindrical cutter mounted, the mounted cutter can be identified based on the level of the drill motor current detected at a time when a predetermined period of time has expired from the start of drilling or based on the duration of time from the start of drilling until a preset level of the drill motor current is reached. Further, necessity for cooling the cylindrical cutter and an amount of water supplied to the water hose to this effect can also be determined depending on the type of cylindrical rotating cutter being used. Given the length of the cylindrical cutter 10, the water supply can be stopped immediately before the cylindrical cutter drills through the material by monitoring a feeding distance of the electric drilling unit 9 from the start of drilling. This would prevent materials existing beyond the drilled hole from being soiled or otherwise stained by the water.

The invention described above allows effective drilling with the reduction of chatter vibration at the start of drilling. The invention reduces chatter vibration and allows more effective drilling by changing the rotation speed of the cylindrical cutter and the duration of time at that rotation speed, to the speed that allows chatter-vibration-free drilling with any one type of cylindrical cutter. Because drilling can be performed at the rotation and feed speeds best suited for the type of cylindrical cutter being used, more effective drilling is possible.

What is claimed is:

1. A method of controlling a drilling machine including a drilling unit which has a drill motor, said drill motor rotating a cylindrical cutter mounted on said drilling unit when supplied with a driving current, and a feed motor operatively coupled to said cylindrical cutter for linearly moving said cylindrical cutter for drilling into a material, the method comprising the steps of:

rotating said drilling motor at a first rotation speed during a predetermined period of time from a start of drilling by controlling a rotation speed of said feed motor; and subsequently rotating said drilling motor at a second rotation speed faster than the first rotation speed until an end of drilling by controlling the rotation speed of said feed motor, further comprising the steps of:

before rotating said drilling motor at the first rotation speed, detecting a no-load current flowing through said drill motor;

identifying said cylindrical cutter being used based on the no-load current; and determining the first and second rotation speeds based on information obtained in said identifying step.

2. The method as set forth in claim 1, further comprising the step of determining the end of drilling based on the no-load current.

3. A drilling machine comprising;

a drilling unit including a drill motor, said drill motor rotating a cylindrical cutter mounted on said drilling unit when supplied with a driving current;

a feed motor operatively coupled to said cylindrical cutter for linearly moving said cylindrical cutter for drilling into a material; and control means for controlling a rotation speed of said drill motor by supplying said drill motor with a first driving current during a predetermined period of time from a start of drilling and subsequently supplying said drill motor with a second driving current higher in level than the first driving current until an end of drilling, whereby chatter vibration of said cylindrical cutter is prevented from occurring at an initial period of drilling, wherein said control means determines the first driving current, the predetermined period of time, and the second driving current depending on said cylindrical cutter being used, wherein said control means comprises current detecting means for detecting the driving current flowing through said drill motor, and wherein said control means identifies said cylindrical cutter being used based on a no-load current detected by said current detecting means after said cylindrical cutter has been mounted and before the start of drilling.

4. The drilling machine as set forth in claim 3, further comprising storage means operatively connected to said control means for storing the first driving current, the predetermined period of time, and the second driving current in relation to the no-load current for allowing said control means to determine the first driving current, the predetermined period of time, and the second driving current based on the no-load current by referring to said storage means.

5. The drilling machine as set forth in claim 4, wherein said control means further controls a rotation speed of said feed motor for controlling a feeding speed of said cylindrical cutter in a first direction in which drilling into the material proceeds so that the rotation speed of said drill motor is maintained at a first speed during the predetermined period of time and at a second speed thereafter.

6. The drilling machine as set forth in claim 5, wherein said control means further comprises reversing means for reversing a moving direction of said cylindrical cutter to move in a second direction opposite the first direction and wherein said control means determines the end of drilling and said reversing means reverses the moving direction of said cylindrical cutter at the end of drilling.

7. The drilling machine as set forth in claim 3, wherein said control means obtains values for the first driving current, the predetermined period of time, and the second driving current from a storage means operatively connected to said control means.

8. A drilling machine comprising:

a drilling unit including a drill motor, said drill motor rotating a cylindrical cutter mounted on said drilling unit when supplied with a driving current;

a feed motor operatively coupled to said cylindrical cutter for linearly moving said cylindrical cutter for drilling into a material; and control means for controlling a rotation speed of said drill motor by supplying said drill motor with a first driving current during a predetermined period of time from a start of drilling and subsequently supplying said drill motor with a second driving current higher in level than the first driving current until an end of drilling, whereby chatter vibration of said cylindrical cutter is prevented from occurring at an initial period of drilling, wherein said control means determines the first driving current, the predetermined period of time, and the second driving current depending on said cylindrical cutter being used, wherein said control means comprises current detecting means for detecting the driving current flowing through said drill motor, and wherein said control means identifies said cylindrical cutter being used based on a duration of time from the start of drilling until a preset level of the driving current is reached, the duration of time being determined after said cylindrical cutter has been mounted.

9. A drilling machine comprising:

a drilling unit including a drill motor, said drill motor rotating a cylindrical cutter mounted on said drilling unit when supplied with a driving current;

a feed motor operatively coupled to said cylindrical cutter for linearly moving said cylindrical cutter for drilling into a material; and control means for controlling the driving current supplied to said drill motor by supplying said drill motor with a first driving current from a start of drilling until a predetermined drilling depth is reached and subsequently supplying said drill motor with a second driving current higher in level than the first driving current for drilling the material at a deeper level than the predetermined drilling depth, whereby chatter vibration of said cylindrical cutter is prevented from occurring, wherein said control means determines the first driving current, the predetermined drilling depth, and the second driving current depending on said cylindrical cutter being used, wherein said control means comprises current detecting means for detecting the driving current flowing through said drill motor, and wherein said control means identifies said cylindrical cutter being used based on a no-load current detected by said current detecting means after said cylindrical cutter has been mounted and before the start of drilling.

10. The drilling machine as set forth in claim 9, wherein said control means further controls a rotation speed of said feed motor for controlling a feeding speed of said cylindrical cutter in a first direction in which drilling into the material proceeds so that the rotation speed of said drill motor is maintained at a first speed until the predetermined drilling depth is reached and at a second speed thereafter.

11. The drilling machine as set forth in claim 10, wherein said control means further comprises reversing means for reversing a moving direction of said cylindrical cutter to move in a second direction opposite the first direction and wherein said control means determines the end of drilling and said reversing means reverses the moving direction of said cylindrical cutter at the end of drilling.

12. The drilling machine as set forth in claim 9, wherein said control means obtains values for the first driving current, the predetermined drilling depth, and the second driving current from a storage means operatively connected to said control means.

* * * * *